No. 639,248. Patented Dec. 19, 1899.
D. KEREKES.
NAILLESS HORSESHOE.
(Application filed July 6, 1897.)
(No Model.)
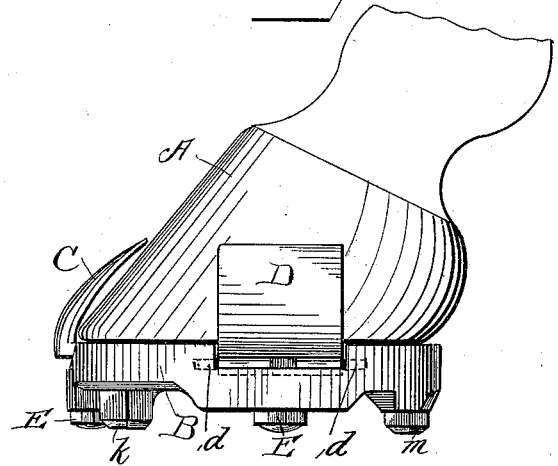
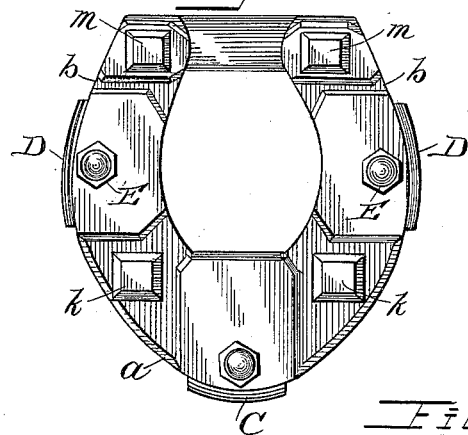
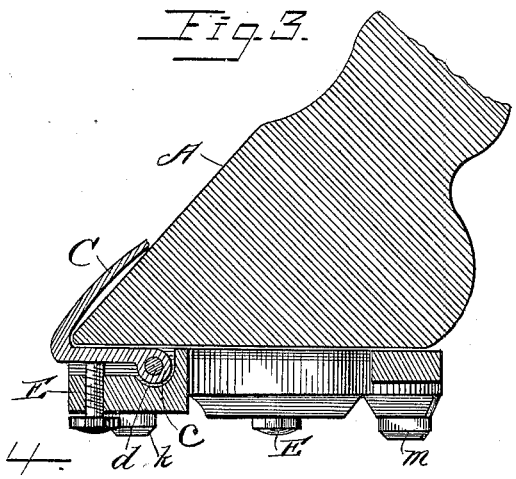
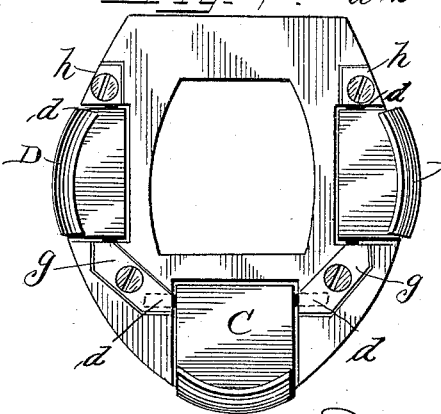
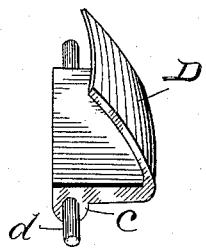
Witnesses:
R. J. Jacker.
J. D. Chubb.
Inventor:
Daniel Kerekes
By Frank D. Thomason
Atty.
THE NORRIS PETERS CO., PHOTO-LITHO., WASHINGTON, D. C.

UNITED STATES PATENT OFFICE.

DANIEL KEREKES, OF CHICAGO, ILLINOIS.

NAILLESS HORSESHOE.

SPECIFICATION forming part of Letters Patent No. 639,248, dated December 19, 1899.

Application filed July 6, 1897. Serial No. 643,514. (No model.)

*To all whom it may concern:*

Be it known that I, DANIEL KEREKES, a citizen of the United States, and a resident of Chicago, Cook county, Illinois, have invented certain new and useful Improvements in Horseshoes, of which the following is a full, clear, and exact description, reference being had to the accompanying drawings and to the letters of reference marked thereon.

The object of my invention is to provide a horseshoe which can be quickly and easily applied to or removed from the hoof of a horse by hand without the aid of nails or the assistance of a blacksmith. This I accomplish by a horseshoe having pivotally secured thereto a series of clamps, which are so located that when suitably manipulated through the medium of the gage-screws used in connection therewith the shoe can be securely attached to the hoof, substantially as hereinafter fully described and as illustrated in the drawings, in which—

Figure 1 is a side view of a horse's hoof, showing my improved horseshoe applied thereto. Fig. 2 is a plan view of the under side of said horseshoe. Fig. 3 is a vertical central section through a horse's hoof and the said horseshoe applied thereto. Fig. 4 is a plan view of the top side of said horseshoe. Fig. 5 is a perspective view of one of the lugs or clamps of the horseshoe detached therefrom, and Fig. 6 shows perspective views of the retaining-blocks for the trunnions of said clamps.

In the drawings, A represents a horse's hoof, and B represents my improved horseshoe attached to said hoof. This horseshoe may be of any suitable design so far as it itself is concerned, excepting that its upper surface is recessed at the toe $a$ and at the sides $b\,b$, so as to provide seats for the clamps C and D. These clamps are of an acute angular shape or V shape, and the end edge of the horizontal portions thereof is provided with a knuckle $c$, through which a pivotal pin $d$ passes, which is of such length that its ends project beyond the sides of the clamp and form trunnions. The width of the horizontal portions of these clamps corresponds to the width of the recesses in which they are seated. Thus the ends of the pivotal pins extend beyond the sides of said recesses and are journaled in bearings made to receive the same. The journal portions of said pivotal pins are retained in their respective bearings by means of the retaining-blocks $g$ and $h$. The blocks $h$ are of a trapezoidal shape and fit into a depression in the upper surface of the shoe, next the outside edge and near the heels of the same, and are secured in place, as shown, by a screw. The blocks $g$ are longer than the blocks $h$, and their longitudinal sides are parallel and their ends are pointed, as shown. These blocks $g$ are placed in depressions in the upper surface of the shoe, running diagonally between the recesses in the sides of the shoe and the toe-recess thereof, and they cover and keep in place both trunnions of the toe-clamp and the forward trunnions of the side clamps of the shoe. The vertically-disposed portions of these clamps are suitably bent and given a slightly concavo-convex shape, so that when they are forced against the hoof by the gage-screws E they conform to the shape of the hoof. The gage-screws E are tapped up through the shoe from underneath, and their upper ends impinge and bear upward against the horizontal portion of the clamps near the angle thereof, so that by properly manipulating said screws said clamps may be made to move so that their more vertically disposed portions bear tightly against the hoof and securely clamp the shoe thereto.

I prefer to make the depth of the shoe under the clamp-recesses greater than the remainder thereof, so as to preserve a more uniform thickness of the shoe from end to end, and I prefer to connect or tie the heels of the shoe by a suitable cross-bar, so as to give greater stability and rigidity to the sides of the shoe when clamped to the hoof; but this special construction of the shoe may be dispensed with and any other design adopted, so long as it is practicable for the purposes of my invention.

I use four calks $k$ and $m$ for my improved horseshoe, which are located, respectively, on either side of the toe and near the heels thereof; but these may be dispensed with or otherwise disposed of, so long as they protect the heads of the screws and prevent their receiving the full weight and force of the blow as the foot of the horse and the shoe worn thereby come in contact with the ground.

What I claim as new is—

The combination with a horseshoe having suitable recesses in the upper surface thereof, of a series of independent V-shaped clamps, the inner ends of the horizontal portions of which are seated in said recesses and suitably pivoted in the side walls thereof, and gage-screws tapped upward through said shoes and respectively bearing up against the under side of the horizontal part of each of said clamps, as and for the purpose set forth.

DANIEL KEREKES.

Witnesses:
J. H. SCHLUND,
J. M. NASH.